3,557,252
POLY(VINYL HALIDE) COMPOSITIONS
Henry L. Hsieh, Bartlesville, Okla., and Francis X. Mueller, Jr., Louisville, Ky., assignors to Phillips Petroleum Company, a corporation of Delaware
No Drawing. Filed Jan. 17, 1969, Ser. No. 792,168
Int. Cl. C08f 29/24
U.S. Cl. 260—876          7 Claims

ABSTRACT OF THE DISCLOSURE

A poly(vinyl halide) is mixed with a block copolymer of conjugated dienes and lactones or with block copolymers of monovinyl-substituted aromatic compounds, conjugated dienes and lactones to form a composition with improved impact resistance.

---

This invention relates to poly(vinyl halide) compositions. In another aspect, this invention relates to compositions of poly(vinyl halide) and block copolymers of conjugated dienes and lactones or block copolymers of monovinyl-substituted aromatic compounds, conjugated dienes and lactones.

These compositions overcome many of the well-known deficiencies of poly(vinyl halides) which manifest themselves in processes such as extrusion, molding, and the like.

Accordingly, an object of this invention is to provide poly(vinyl halide) compositions. Another object is to provide compositions of poly(vinyl halide) and block copolymers of conjugated dienes and lactones or block copolymers of monovinyl-substituted aromatic compounds, conjugated dienes and lactones.

Other objects, aspects and advantages of this invention will be apparent to those skilled in the art from the disclosure and appended claims.

Block copolymers of conjugated dienes and lactones or block copolymers of monovinyl-substituted aromatic compounds, conjugated dienes and lactones are admixed with poly(vinyl halide) resins. The result is a composition with improved impact resistance.

The poly(vinyl halide) can be a polymer of vinyl chloride, bromide, or fluoride.

Lactones that can be employed in this invention can be represented by the formula

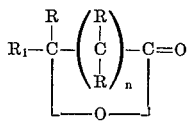

wherein $R_1$ is one of hydrogen and a radical of the formula

and when $R_1$ is the specified radical, no R is attached to the carbon atom to which the radical is attached, wherein R is one of hydrogen, alkyl, cycloalkyl, alkenyl, cycloalkenyl, or an aryl radical, or combinations thereof such as alkaryl, alkenylaryl, cycloalkylalkyl, etc., wherein $n$ is an integer which can be 1, 3, or 4, and wherein the total number of carbon atoms in the substitutents employed, if any, is in the range of 1 to 12, inclusive.

Suitable lactones include beta-propiolactone, delta-valerolactone, epsilon-caprolactone, and lactones of the following acids:

2-methyl-3-hydroxypropionic acid,
3-hydroxynonanoic or 3-hydroxypelargonic acid,
2-dodecyl-3-hydroxypropionic acid,
2-cyclopentyl-3-hydroxypropionic acid,
3-phenyl-3-hydroxypropionic acid,
2-naphthyl-3-hydroxypropionic acid,
2-n-butyl-3-cyclohexyl-3-hydroxypropionic acid,
2-phenyl-3-hydroxytridecanoic acid,
2-(2-methylcyclopentyl)-3-hydroxypropionic acid,
2-methylphenyl-3-hydroxypropionic acid,
3-benzyl-3-hydroxypropionic acid,
2,2-dimethyl-3-hydroxypropionic acid,
2-methyl-5-hydroxyvaleric acid,
3-cyclohexyl-5-hydroxyvaleric acid,
4-phenyl-5-hydroxyvaleric acid,
2-heptyl-4-cyclopentyl-5-hydroxyvaleric acid,
2-methyl-3-phenyl-5-hydroxyvaleric acid,
3-(2-cyclohexylethyl)-5-hydroxyvaleric acid,
2-(2-phenylethyl-)4-(4-cyclohexylbenzyl)-5-
    hydroxyvaleric acid,
4-benzyl-5-hydroxyvaleric acid,
3-ethyl-5-isopropyl-6-hydroxycaproic acid,
2-cyclopentyl-4-hexyl-6-hydroxycaproic acid,
3-phenyl-6-hydroxycaproic acid,
3-(3,5-diethylcyclohexyl)-5-ethyl-6-hydroxycaproic
    acid,
4-(3-phenylpropyl)6-hydroxycaproic acid,
2-benzyl-5-isobutyl-6-hydroxycaproic acid,
2,2,4-trimethyl-3-hydroxy-3-pentenoic acid,
2-phenyl-6-hydroxy-6-octenoic acid,
2,2-di(1-cyclohexenyl)-5-hydroxy-5-heptenoic acid,
2,2-dipropenyl-5-hydroxy-5-heptenoic acid, and the like. Mixtures of two or more of the above lactones can be employed.

The lactone class represents one of the dissimilar monomers employed in this invention. The other class of dissimilar monomers employed is the group of conjugated dienes and monovinyl-substituted aromatic compounds.

Conjugated dienes that can be employed in this invention are those containing 4 to 12 carbon atoms per molecule, inclusive, for example, 1,3-butadiene, isoprene, 1,3-pentadiene(piperylene), 1,3-hexadiene, 2,3-dimethyl - 1,3-butadiene, 1,3-octadiene, 4-ethyl-1,3-hexadiene, 4-phenyl-1,3-butadiene, 6-phenyl-1,3-hexadiene, and the like including mixtures of two or more of these dienes. Preferred conjugated dienes are butadiene, isoprene, and piperylene.

Monovinyl-substituted aromatic compounds that can be employed in this invention are those containing from 8 to 12 carbon atoms per molecule, inclusive, for example, styrene, 3-methylstyrene, 4-methylstyrene, 4 - isopropylstyrene, 2,4-dimethylstyrene, 1-vinylnaphthalene, 2-vinylnaphthalene, and the like including mixtures thereof. Preferred monovinyl-substituted aromatic compound is styrene.

The polymerization procedures for the above block copolymers and block terpolymers can be any known to the art or according to copending applications, Ser. No. 679,978, filed Nov. 2, 1967, or Ser. No. 726,241, filed May 2, 1968.

The composition of these block copolymers can vary over a wide range. The preferred ratio of conjugated diene to lactone in the block copolymers, containing only two monomers, ranges from about 80:20 to 20:80 parts by weight. The amounts of components in the block copolymers can be as follows: the monovinyl-substituted aromatic compound can range from 5–60 parts by weight; the conjugated diene can range from 10–90 parts by weight; and the lactone can range from 5–60 parts by weight, with the total weight of all three components equaling 100 parts. The preferred ratio of monovinyl-substituted aromatic compound to conjugated diene to lactone in the block copolymers ranges from about 5:90:5 to about 45:10:45 parts by weight. Other ratios for the block terpolymers such as 10:50:40 or 30:20:50 are also included in this invention.

These block copolymers or block terpolymers can be incorporated into the poly(vinyl halide) resin by any mixing procedure that will yield an essentially homogeneous mixture. However, a dry blending procedure is generally employed. Other mixing procedures such as a roll mill, Banbury mixer, Waring Blendor, and the like can also be employed. While the mixing can be done at any temperature, it is preferred that the mixing be conducted at elevated temperatures to promote homogeneity of the mixture.

The amount of block copolymer employed is generally in the range of 5 to 40 parts by weight and the amount of poly(vinyl halide) employed is generally in the range of 95 to 60 parts by weight, based on 100 parts total weight of the composition.

The compositions of this invention have improved impact resistance when compared to the poly(vinyl halide). Accordingly, these compositionn are useful in the production of film and in the production of rigid grades of thermoplastic materials that can be used in forming plastic pipe and other extruded or molded products. The compositions of this invention can contain other additives such as stress-cracking inhibitors, antioxidants, pigments, plasticizers, fillers, and the like. The compositions of this invention are impact resistant with or without these other additives, when such additives are employed in conventional amounts.

The advantages of this invention are further illustrated by the following example. The reactants, proportions and other specific conditions are presented as being typical and should not be construed to limit the invention unduly.

EXAMPLE I

Several styrene/butadiene/$\epsilon$-caprolactone block copolymers and a butadiene/$\epsilon$-caprolactone block copolymer were prepared and evaluated as impact modifiers for a polyvinyl chloride resin. The polymers were prepared according to the following procedure. The polymerization recipe is shown below and the polymerization results are given in Table I.

Polymerization recipe

| | |
|---|---|
| Cyclohexane, parts by weight | 780 |
| 1,3-butadiene, parts by weight | Variable |
| Styrene, parts by weight | Variable |
| $\epsilon$-Caprolactone, parts by weight | Variable |
| Ethylene oxide, mhm.[1] | Variable |
| Alkyllithium, mhm.[1] | Variable |
| Temperature, °C. | 70 |
| Time, hours | 26–28 |

[1] Mhm=millimoles per 100 grams of monomers.

Cyclohexane was charged to the reactor first. The reactor was then purged with nitrogen after which the styrene was added and then the alkllithium. If styrene was not added, the alkyllithium was charged after the 1,3-butadiene. The styrene was polymerized at 70° C. for one hour, then 1,3-butadiene was added and polymerized at 70° C. for 1.5 hours. Ethylene oxide was charged next, followed by $\epsilon$-caprolactone. The temperature of the reaction mixture was adjusted to 70.° C., and the reaction mixture was agitated for 24–25 hours. The reaction mixture was terminated with a 10 weight percent solution of 2,2'-methylene-bis(4-methyl-6-tert-butylphenol) in equal parts by volume of isopropyl alcohol and toluene. The amount used was sufficient to provide one part by weight of this antioxidant per 100 parts of monomers. Each reaction mixture was coagulated in isopropyl alcohol and the polymer was separated and dried.

The dried polymers were compounded with a polyvinyl chloride resin in the recipe shown below.

Compounding recipe

| | Parts by weight |
|---|---|
| Polyvinyl chloride [1] | Variable |
| Impact modifier | Variable |
| Advastab T–360 [2] | 2 |
| Advastab DBTDL [3] | 1 |
| Color masterbatch [4] | 0.9 |
| Advawax 140 [5] | 0.5 |
| Advawax 280 [6] | 0.9 |

[1] Diamond 40, a bottle-grade resin from Diamond Alkali Company.
[2] Heat and light stabilizer. An organo-tin mercapto compound as described in U.S. 3,027,350.
[3] Heat and light stabilizer, dibutyltin dilaurate.
[4] Dry mix of 0.046 gram Cyan Blue, a blue phthalocyanine pigment from American Cyanamid Company, with 100 grams of polyvinyl chloride.
[5] Fatty acid ester; melting point 140° F.; saponification number 160; iodine number 1; acid number 2; free fatty acid 1%.
[6] N,N-ethylene-bis(stearamide).

These mixtures were prepared as follows. Polyvinyl chloride was added to a Waring Blendor mixer and stirred while Advastab T–360 and Advastab DBTDL were added and while the mixture temperature was kept below 210° F. The impact modifier was added next while the temperature was kept below 225° F. Finally, Advawax 140, Advawax 280 and the color masterbatch were added while the temperature was allowed to reach 240° F. and while mixing continued for 15 minutes. Next, each mixture was cooled quickly to room temperature. The dry mix was then blended on a roll mill at 350° F. for 10 minutes and then milled for another 5 minutes at 350° F. The composition was cut from the mill in sheets of 70 mil thickness. Strips were cut from these sheets to fill mold cavities. Molding was performed at 370° F. in a compression mold at 5,000 to 20,000 p.s.i. in 3 minutes, 20,000 to 30,000 p.s.i. in 3 minutes, 30,000 to 40,000 p.s.i. in 3 minutes and then held at 40,000 p.s.i. for 6 minutes. The mold was cooled at a rate of 27° per minute to room temperature. Impact strength test specimens were made from slabs of ¼-inch thickness and other test specimens were made from slabs of 1.16 inches thickness. The results of these tests are shown in Table II.

TABLE I

| Run No.: | Styrene, parts by weight | Butadiene, parts by weight | $\epsilon$-Caprolactone, parts by weight | Alkyllithium, mhm. | Ethylene oxide, mhm. | Conversion, percent |
|---|---|---|---|---|---|---|
| 1[a] | 45 | 10 | 45 | [b] [c] | 8 | [d] |
| 2 | 25 | 50 | 25 | [e] 2.9 | 8 | 93 |
| 3 | 0 | 50 | 50 | [e] 2.9 | 9 | 94 |
| 4 | 15 | 70 | 15 | [e] 2.3 | 8 | 100 |
| 5 | 20 | 60 | 20 | [e] 2.3 | 8 | 100 |

[a] A blend of four samples made with sec-butyllithium in the amounts shown in ([b]).
[b] Amounts used in the four runs were as follows: 2.7, 2.9, 3.1 and 3.3 mhm.
[c] sec-Butyllithium.
[d] Conversions in the four runs were as follows: 95, 100, 95 and 98 percent.
[e] n-Butyllithium.

TABLE II

| Run No. | Impact Modifier | | PVC parts by weight | Physical properties | | |
|---|---|---|---|---|---|---|
| | Parts by weight | Composition | | Flexural modulus, p.s.i.[a] | Tensile yield, p.s.i.[b] | Izod impact, ft. lbs./in notch[c] |
| 1[d] | 100 | Styrene/Butadiene/ε-Caprolactone (45/10/45). | 0 | 140,000 | [e]3,460 | 0.34 |
| 2 | 10 | ...do... | 90 | 428,000 | 7,863 | 0.75 |
| 3 | 0 | | 100 | 459,000 | 8,870 | 0.60 |
| 4 | 10 | Styrene/Butadiene/ε-Caprolactone (25/50/25). | 90 | 371,000 | 6,623 | 1.00 |
| 5 | 10 | Styrene/Butadiene/ε-Caprolactone (15/70/15). | 90 | 339,000 | 5,710 | 2.60 |
| 6 | 10 | Styrene/Butadiene/ε-Caprolactone (20/60/20). | 90 | 385,000 | 6,927 | 1.51 |

[a] ASTM-D-790-63.
[b] ASTM-D-638-61T.
[c] ASTM-D-256-56.
[d] Physical properties obtained on polymer in absence of any additives found in polyvinyl chloride compounding recipe.
[e] Tensile at Break.

The results of these tests show the block copolymers of this invention to be effective as impact strength improvers in polyvinyl chloride resins. Comparisons of Runs 1, 2, and 3, reveal the mixture (Run 2) to have higher impact strength than either the copolymer (Run 1) or polyvinyl chloride (Run 3) alone. Runs 4, 5 and 6 reveal other mixtures which demonstrate a desirable impact strength.

Reasonable variations and modifications are possible within the scope of this disclosure without departing from the spirit and scope thereof.

We claim:

1. A composition comprising a mixture of (a) 95 to 60 parts by weight of a poly(vinyl halide) and (b) 5 to 40 parts by weight of a block copolymer of conjugated dienes and lactones or block copolymers of monovinyl substituted aromatic compounds, conjugated dienes and lactones, wherein said lactones have the formula

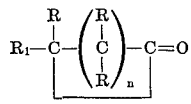

wherein $R_1$ is one of hydrogen and a radical of the formula

and when $R_1$ is the specified radical, no R is attached to the carbon atom to which the radical is attached; and each R is one of hydrogen, a saturated aliphatic, a saturated cycloaliphatic, or an aromatic radical, or a combination thereof; $n$ is an integer which can be 1, 3, 4 and the total number of carbon atoms in the substituents employed, if any, is in the range of 1 to 12, inclusive.

2. The composition according to claim 1 wherein said polyvinyl halide is polyvinyl chloride.

3. The composition according to claim 2 wherein said conjugated dienes have from 4 to 12 carbon atoms per molecule, inclusive and said monovinyl substituted aromatic compounds have from 8 to 12 carbon atoms per molecule, inclusive.

4. The composition according to claim 3 wherein the amount of said monovinyl substituted aromatic compound, said conjugated diene, and said lactone in said block copolymer is 5–60, 10–90, and 5–60 parts by weight, respectively, the total weight of monomer components in said block copolymer equaling 100 parts.

5. The composition according to claim 4 wherein said conjugated diene is butadiene, said monovinyl substituted aromatic compound is styrene and said lactone is ε-caprolactone.

6. The composition according to claim 3 wherein the weight ratio of said conjugated diene to said lactone is from about 20:80 to about 80:20 based on 100 total parts by weight of monomer components.

7. The composition according to claim 6 wherein said conjugated diene is butadiene and said lactone is ε-caprolactone.

References Cited

UNITED STATES PATENTS 2,970,979   2/1961   Meder et al. _____ 260—890
3,465,067   9/1969   Waterman et al. _____ 260—890
3,483,275   12/1969  Waterman et al. _____ 260—890

SAMUEL H. BLECH, Primary Examiner

U.S. Cl. X.R.

260—23.7, 41.5, 45.75, 880, 887, 890

UNITED STATES PATENT OFFICE

CERTIFICATE OF CORRECTION

Patent No. 3,557,252     Henry L. Hsieh et al     Dated: January 19, 1

It is certified that error appears in the above-identified patent and that Letters Patent are hereby corrected as shown below:

Column 5, beginning at line 36, the formula which reads $$R_1 - \underset{\underset{\displaystyle _____}{}}{\overset{R}{\underset{|}{C}}} - \left( \overset{R}{\underset{\underset{R}{|}}{\underset{|}{C}}} \right)_n - C = 0 \qquad \text{should read} \qquad R_1 - \underset{\underset{\underset{\displaystyle \_\_\_ O \_\_\_}{}}{}}{\overset{R}{\underset{|}{C}}} - \left( \overset{R}{\underset{\underset{R}{|}}{\underset{|}{C}}} \right)_n - C = 0$$

Signed and sealed this 2nd day of November 1971.

(SEAL)
Attest:

EDWARD M. FLETCHER, JR.     ROBERT GOTTSCHALK
Attesting Officer     Acting Commissioner of Patents